US009489855B2

(12) United States Patent
Beavers et al.

(10) Patent No.: US 9,489,855 B2
(45) Date of Patent: *Nov. 8, 2016

(54) INTERACTIVE PRESENTATION SYSTEM

(71) Applicant: Microsoft Technology Licensing, LLC, Redmond, WA (US)

(72) Inventors: Jay C. Beavers, Duvall, WA (US); Lora J. Heiny, Seattle, WA (US); Christopher H. Moffatt, Austin, TX (US); Bomani Siwatu, Seattle, WA (US); Ravipal S. Soin, Kirkland, WA (US); Kathleen P. Mulcahy, Seattle, WA (US); Neema Mortazavi Moraveji, Rockville, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/329,867

(22) Filed: Jul. 11, 2014

(65) Prior Publication Data
US 2014/0349271 A1  Nov. 27, 2014

Related U.S. Application Data

(63) Continuation of application No. 12/147,506, filed on Jun. 27, 2008, now Pat. No. 8,794,979.

(51) Int. Cl.
*G09B 5/14* (2006.01)
*G09B 5/02* (2006.01)
(Continued)

(52) U.S. Cl.
CPC . *G09B 5/02* (2013.01); *G09B 5/14* (2013.01); *G09B 7/07* (2013.01); *G09B 5/06* (2013.01)

(58) Field of Classification Search
USPC .......................... 434/350, 322, 323
See application file for complete search history.

(56) References Cited

U.S. PATENT DOCUMENTS 6,128,629 A  10/2000  Bretschneider et al.
6,155,840 A  12/2000  Sallette
(Continued)

OTHER PUBLICATIONS

Amiot, L., "Introduction to Videoconferencing," Internet2 Commons Site Coordinator Training, Sep. 2004, Austin, Texas, 24 pages.
(Continued)

*Primary Examiner* — Robert J Utama
(74) *Attorney, Agent, or Firm* — Jessica M. Meyers; Alpana Tiwari; Micky Minhas

(57) ABSTRACT

A computerized educational presentation system is provided. The system may include a presentation application program. The presentation application program may include a presentation module that is operable in an author mode to create an educational presentation having a plurality of educational resources. The educational resources may include at least a poll. Further, the presentation module may be operable in a presentation mode to make the educational presentation accessible for viewing at a plurality of student computing devices. The presentation application program further may include an interaction module. During the author mode, the interaction module may update one or more educational resources of the educational presentation in response to receiving user edits via an author tool. During the presentation mode, the interaction module may receive student feedback at a teacher computing device in response to presentation of the poll at the plurality of student computing devices.

17 Claims, 4 Drawing Sheets

(51) Int. Cl.
    *G09B 7/07*    (2006.01)
    *G09B 5/06*    (2006.01)

(56) References Cited

U.S. PATENT DOCUMENTS

| | | |
|---|---|---|
| 6,287,125 B1 | 9/2001 | Dorcely |
| 6,628,918 B2 | 9/2003 | Roschelle et al. |
| 6,654,588 B2 | 11/2003 | Moskowitz et al. |
| 6,760,749 B1 | 7/2004 | Dunlap et al. |
| 6,885,844 B2 | 4/2005 | Roschelle et al. |
| 7,092,669 B2 | 8/2006 | Sakai et al. |
| 2002/0031756 A1 | 3/2002 | Holtz et al. |
| 2002/0147770 A1* | 10/2002 | Tang ............... H04L 29/06 709/203 |
| 2002/0188517 A1* | 12/2002 | Banerjee ........... G06Q 30/0633 705/26.8 |
| 2003/0182545 A1* | 9/2003 | Chalmers ........... G06F 11/2289 713/1 |
| 2003/0196114 A1 | 10/2003 | Brew et al. |
| 2004/0002049 A1 | 1/2004 | Beavers et al. |
| 2004/0205130 A1 | 10/2004 | Banerjee et al. |
| 2004/0255232 A1 | 12/2004 | Hammond et al. |
| 2005/0081159 A1 | 4/2005 | Gupta et al. |
| 2005/0196773 A1* | 9/2005 | Sidransky ............ G06F 19/24 435/6.16 |
| 2007/0192785 A1 | 8/2007 | Pellinat et al. |
| 2007/0266325 A1 | 11/2007 | Helm et al. |
| 2007/0282948 A1 | 12/2007 | Praino et al. |
| 2008/0070218 A1 | 3/2008 | Ahl et al. |
| 2009/0035733 A1 | 2/2009 | Meitar et al. |
| 2009/0325142 A1 | 12/2009 | Beavers et al. |

OTHER PUBLICATIONS

Khatri, V. et al., "Developing a Learner-Centric Collaborative Pedagogical Environment," AT&T Fellows Final Reports, Indiana University, Apr. 2005, 8 pages.

Mathur, M. et al., "The Use of Virtual Classroom Software for Flexible Learning," Southern Cross University, Jul. 2005, 11 pages.

"Audience Response," Wikipedia Entry, http://en.wikipedia.org/wiki/Audience_response, Available as Early as Jul. 2006, 7 pages.

"Adobe Breeze Presenter," Product Review Website, University of Wisconsin, http://academictech.doit.wisc.edu/resources/products/pptoweb/breeze.htm, Available as Early as Nov. 2006, 3 pages.

"VBrick Systems Delivers Dynamic Plug-and-Present Streaming Video and Multimedia Capabilities," VBrick Website Press Release, http://www.vbrick.com/news/index.asp?ItemID=237&cid=74&pcid=70, Apr. 2008, 2 pages.

\* cited by examiner

INTERACTIVE PRESENTATION SYSTEM

CROSS REFERENCE TO RELATED APPLICATIONS

This application is a continuation from U.S. application Ser. No. 12/147,506, filed Jun. 27, 2008, and titled INTERACTIVE PRESENTATION SYSTEM, which is hereby incorporated herein by reference in its entirety for all purposes.

BACKGROUND

In an educational environment, a teacher may teach a lesson by presenting educational content to students in a classroom setting. The educational content may be organized into a presentation, such as a slide deck, which may be displayed by a display device, such as a projector or interactive whiteboard, so that the presentation may be viewed by all of the students in the classroom. During presentation of the slide deck, the teacher may lecture about each slide and the students may take notes about the lecture via notepads. The teacher may ask questions of the class, and one or more students may respond orally. Although many interesting ideas may emerge as a result of such class discussion, it is difficult for teachers to create a record of the ideas for students to refer to later after class using current presentation technologies. Further, some students may feel intimidated about speaking in class, or the sheer size of the class may preclude having each student speak on a topic. In addition, since the order of the presentation is prearranged, it is often difficult for the teacher to change the presentation dynamically to address topics that have arisen during the discussion. Current presentation technologies do not adequately address these concerns.

SUMMARY

A computerized educational presentation system is provided. The system may include a presentation application program. The presentation application program may include a presentation module operable in an author mode to create an educational presentation having a plurality of educational resources. The educational resources may include at least a poll. Further, the presentation module may be operable in a presentation mode to make the educational presentation accessible for viewing at a plurality of student computing devices. The presentation application program further may include an interaction module. During the author mode, the interaction module may update one or more educational resources of the educational presentation in response to receiving user edits via an author tool. During the presentation mode, the interaction module may receive student feedback at a teacher computing device in response to presentation of the poll at the plurality of student computing devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure is directed to facilitating presentation of interactive content distributed to a plurality of computers for display to an audience. The interactive content may promote presenter-audience interaction and collaboration in real-time which may enrich the presentation experience of the audience by engaging the audience in learning in an integrated manner as opposed to merely broadcasting a presentation to the audience, without opportunity for audience interaction in the presentation. The present disclosure is described in an educational setting utilizing a teacher-student paradigm; however the concepts described herein are broadly applicable to a variety of presentation settings, such as business meetings, academic conferences, governmental and civic gatherings, etc.

Figure 1:
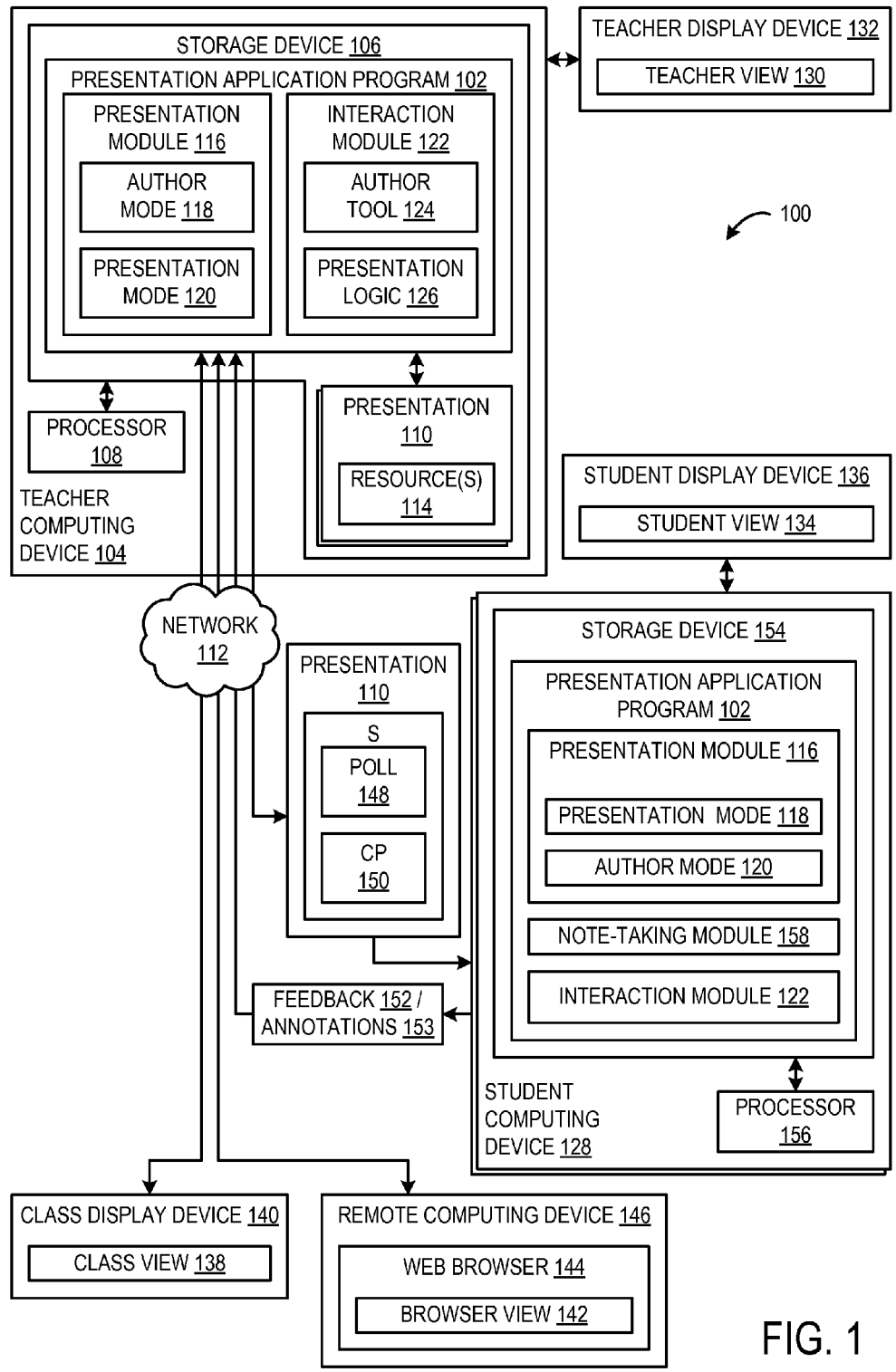
FIG. 1 is a schematic view illustrating a computerized educational presentation system according to an embodiment of the present disclosure.

FIG. 1 is a schematic view illustrating an embodiment of a computerized educational presentation system 100 in accordance with the present disclosure. Computerized educational presentation system 100 may include a presentation application program 102 to be executed on a computing device, such as a teacher computing device 104. It will be appreciated that presentation application program 102 may be implemented via code that is stored in storage device 106 and executed by processor 108 of teacher computing device. In one example, a storage device is a mass storage device, such as a hard drive. Teacher computing device 104 may be virtually any suitable type of computing device. For example, teacher computing device 104 may be a personal computer (PC), a portable laptop computing device, a tablet computing device, a mobile computing device, a networked computing device, etc.

In some embodiments, the presentation application program 102 may be stored in a storage device remote from the teacher computing device and accessible by the teacher computing device. The presentation application program 102 may be executable by the teacher computing device as well as other computing devices of the computerized educational presentation system.

Presentation application program 102 may be utilized at teacher computing device 104 to create an educational presentation 110 that may be distributed for viewing and interaction at a plurality of computing devices of system 100, via network 112. Network 112 may facilitate wired and/or wireless communication between computing devices connected to the network. Further, network 112 may include various interconnected networking devices that facilitate communication. It will be appreciated that network 112 may, for example, include a local area network (LAN) and/or a wide area network (WAN), such as the Internet.

Educational presentation 110 may include a plurality of educational resources including educational resource 114. Educational resource 114 may include virtually any suitable presentation file type. For example, an educational resource may be an image file, a video file, a slide deck file, an audio file, an executable file, or a document file. In some cases, an educational resource may include interactive content such as a form, executable file, or script. Such interactive content may be used to implement a quiz, poll, collaboration page or other educational assessment mechanism that may be used by a teacher to assess the understanding of a plurality of students in a classroom setting, for example.

Presentation application program 102 may include a presentation module 116 operable in an author mode 118 to display an educational presentation for creation or editing. During author mode 118, presentation module 116 may be configured to display the educational presentation only at the computing device on which the educational presentation is being created/edited without being accessible for viewing at other computing devices.

Upon creation/editing, an educational presentation may be stored for future use. In the illustrated embodiment, educational presentation 110 is stored in storage device 106 of teacher computing device 104. Educational presentation may be accessed by a user (e.g., teacher) locally on teacher computing device 104 or may be accessed remotely over network 112 by a user (e.g., student) on a remote computing device, such as student computing device 128, subject to permissions set for the educational presentation. It will be appreciated that a plurality of educational presentations may be stored in a storage device for future use and may be retrieved by a computing device for presentation at a plurality of computing devices or for editing locally on single computing device. It will further be appreciated that since the computer network 112 may include wireless communication capabilities, the remote computing device may be configured to wirelessly connect to the computer network 112.

Furthermore, presentation module 116 of presentation application program 102 may be operable in presentation mode 120 to facilitate display of an educational presentation for viewing and interaction at a plurality of computing devices in real-time. In particular, during presentation mode 120, presentation application program 102 may be configured to generate a variety of graphical user interfaces (GUIs) having independent views of educational presentation 110. The independent views may be defined by a teacher to differ in content or appearance from each other; although it will be appreciated that content may be shared between the independent views. Moreover, the different GUIs may include various different tools and/or visual panes that may affect the way in which a user interacts with a GUI.

For example, during presentation mode 120, presentation module 116 of presentation application program 102 may be configured to generate a teacher view 130 presented on a teacher display device 132. Teacher view 130 may display educational presentation 110 as well as other information pertinent to the teacher, such as student information, interactive content information, presentation controls, etc. A student view 134 may be presented on a student display device 136 of student computing device 128. Student computing device 128 may include virtually any suitable type of computing device. In one example, student computing device 128 may be a portable device such that a student may easily transport the computing device to a lecture, or such that a student may view an educational presentation from a remote location. For example, a student computing device may include a personal computing device, portable laptop computing device, a personal digital assistant, a mobile communication device, etc. Student view 134 may display educational presentation 110 as well as other information pertinent to each student on student display device 136.

A class view 138 may be presented on a class display device 140. In one example, the class display device is a network connected projection device in communication with the teacher computing device. Typically, the class view may have a basic presentation format which may be viewed by a plurality of students in a classroom setting. If desired, a browser view 142 may be provided, which is accessible from a server computing device over network 112 by a remote computing device 146 via a web browser application program 144. The browser view, for example, may be an instance of the student view, which is viewable remotely via a web browser operated on a wide variety of devices, and which provides a subset of the functionality available in the student view. Example independent views of an educational presentation generated by the presentation application program 102 will be discussed in further detail below with reference to FIGS. 2-5.

The type of independent view presented at a computing device may be based on the type of user and/or the type of computing device accessing the educational presentation. In some cases, the type of independent view may be determined by presentation logic 126 of an interaction module 122 of presentation application program 102, discussed below, based on input received upon initiation of presentation mode 120. For example, a teacher may provide specific access/login information in order to edit an educational presentation or view the teacher view of an educational presentation. As another example, a student may provide student computing device information (e.g., IP address, URL, login, etc.) to access the student view of an educational presentation.

The interaction module 122 of presentation application program 102 may be configured to receive input to control creation/editing of an educational presentation as well as to control viewing of and interaction with an educational presentation. Control of presentation application program 102 based on received inputs may differ based on the mode of operation (i.e., presentation mode or author mode). During author mode 118, interaction module 122 may be configured to update one or more educational resource 114 of educational presentation 110 in response to receiving user edits via an author tool 124 of interaction module 122.

Author tool 124 may have various functions such as distributing an educational presentation, creating a poll, creating poll feedback, creating an educational presentation, editing an educational presentation and/or an educational resource, annotating an educational presentation and/or an educational resource, and creating a collaboration page. For example, a user edit may be received at the teacher computing device as a result of a user selecting a function on the author tool which adds an image-file-type educational resource to the educational presentation.

Presentation mode 120 may be initiated in response to selection of a "distribute" operation of author tool 124. Upon initiation of presentation mode 120, independent views of educational presentation 110 may be displayed on display devices of computing devices of system 100. For example, a student view (S) of educational presentation 110 may be distributed to student computing device 128. Student view (S) may display poll 148 to promote real-time student-teacher interaction. Each student may provide feedback 152 to poll 148 which may be sent to teacher computing device 104. Further, during presentation mode 120, interaction module 122 may be configured to receive feedback 152 at teacher computing device 104 in response to presentation of poll 148 at a plurality of student computing devices in student view (S).

Presentation logic 126 of interaction module 122 may be configured to generate a summary (See, e.g., summary 316 in FIG. 3) of feedback 152 based on receiving feedback 152 at teacher computing device 104. Presentation module 116 may be configured to present the summary of feedback in independent views at the plurality of student computing devices as well as other computing devices of system 100. The summary of the feedback may include a graphical representation of the feedback to visually engage the students in an integrated manner. By presenting a poll embedded in the educational presentation and receiving feedback in real-time, a teacher may dynamically assess the understanding of the students and adjust content and/or pace of the presentation accordingly to improve the understanding of the students. Moreover, since the poll is embedded in the educational presentation and the feedback functionality is provided by the presentation application program, real-time interaction and assessment may be performed in an integrated manner without deviating from the flow of the educational presentation.

Furthermore, student view (S) may display a collaboration page (CP) 150 to promote real-time student-teacher collaboration. During display of collaboration (CP) 150, users (e.g., teacher and/or students) may provide collaborative input at a computing device, such as teacher computing device 104 or student computing device 128. Also, in some cases, class display device 140 may include an interactive whiteboard that is configured to receive input, and users may provide input to the class display device.

Interaction module 122 may be configured to receive teacher annotations and/or student annotations 153 based on input at the various computing devices. Annotations may include virtually any type of supplemental content which may enhance the educational presentation, such as notes, questions, files, etc. Presentation logic 126 of interaction module 122 may be configured to update educational presentation 110 with the teacher annotations and/or selected student annotations in response to presentation of the collaboration page at the plurality of student computing devices. In other words, any or all teacher annotations may be displayed in student view (S) among other independent views. Also, one or more student annotations 153 may be selected from the plurality of student annotations 153 collectively received at the teacher computing device for display in the student view (S) as well as other independent views. In one example, selection of a student annotation for display in student view (S) may be based on user input at the teacher computing device, such as a teacher selection of a specified student annotation. It will be appreciated that the interaction module may be configured to update the educational presentation with teacher and/or student annotations other than when a collaboration page is presented. For example, a teacher may annotate a slide of slide deck with additional content during presentation of the slide.

Presentation application program 102 may be configured to be at least partially executable on student computing device 128. Presentation application may be stored in storage device 154 and executed by processor 156 of student computing device 128. In some embodiments, during presentation mode 120, a local version of the educational presentation may be viewable on student display device 136. The local version of the educational presentation may be editable by the user via interaction module 122 at student computing device 128. Further, at student computing device 128, presentation application program 102 may include a note-taking module 158 configured to receive student annotations to supplement the local version of the educational presentation. Although the version of the educational presentation is referred to as being local to the student computing device, it will be appreciated that student computing device 128 may be configured to store the local version in storage that is accessible to the student computing device, such as local storage device 154 of student computing device 128, or the networked storage device 106 of teacher computing device 104. It will be appreciated that each student may interact with a local version of the educational presentation at a respective student computing device. Each local version of the educational presentation may include the same educational resources and teacher annotations; however each version additionally may include annotations of the particular student received via the note-taking module 158.

Student annotations 153 also may be used to promote student-teacher interaction and collaborative learning. In particular, student annotations 153 from each of a plurality of student computing devices may be sent to the teacher computing device. Further, one of the student annotations 153 may be selected as a representative example for presentation in student view (S) as well as other independent views so that the example may be shared with all students. By dynamically updating the educational presentation with teacher and/or student annotations, the educational presentation may be enhanced with supplemental content that may enrich the students' learning experience.

Furthermore, in some embodiments, an educational presentation that is updated with teacher and/or student annotations may be stored for later use. The updated educational presentation may be stored locally at a computing device (e.g., a local version may be saved at a student computing device). Alternatively, the updated educational presentation may be stored in a remote storage device that is accessible by the student computing device and/or the teacher computing device.

Figure 2:
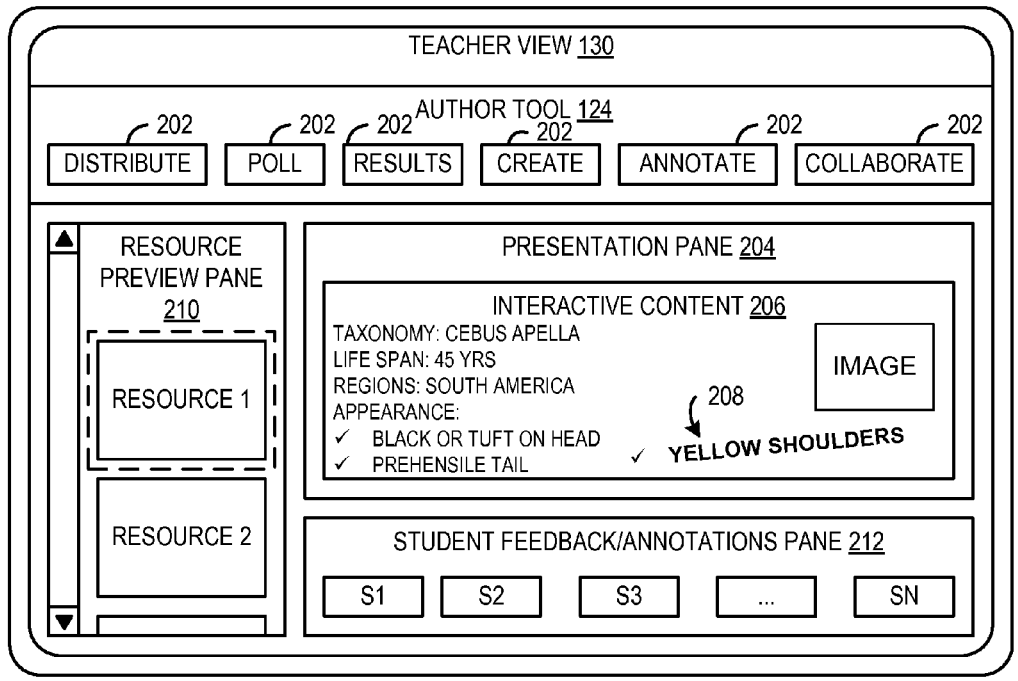
FIG. 2 is a schematic view of an embodiment of a graphical user interface presenting a teacher view of an educational presentation of the system of FIG. 1.

FIG. 2 is a schematic view of an embodiment of a GUI presenting teacher view 130 displayed on a teacher computing device during presentation of an educational presentation. Teacher view 130 may include author tool 124 configured to control creation, editing, and presentation of an educational presentation. In particular, author tool 124 may have function selectors 202 configured to perform an operation selected from the group consisting of distributing an educational presentation, creating a poll, creating a poll feedback summary, creating an educational resource and/or an educational presentation, annotating an educational resource and/or an educational presentation, and creating a collaboration page.

Teacher view 130 may include a presentation pane 204 which may display interactive content 206 of an educational presentation. In the illustrated embodiment, interactive content 206 includes the currently displayed educational resource of the educational presentation. The educational resource is supplemented with a teacher annotation 208 which may be generated from input at the teacher computing device, such as from a stylus, for example.

Teacher view 130 may include an educational resource preview pane 210 which may display a miniaturized list of educational resources in the educational presentation for reference by the teacher during presentation of the educational presentation to the students.

Teacher view 130 may include a student feedback/annotations pane 212 that displays student feedback and/or annotations upon receiving such feedback or annotations at the teacher computing device. The teacher may generate a feedback summary via author tool 124 based on the student feedback that is displayed in the student feedback/annotations pane 212. Further, the teacher may select one of the student annotations displayed in student feedback/annotations pane 212 for display in presentation pane 304 in student view 134 (See FIG. 3) so that all students may view the selected student annotation.

To monitor the activity of the students, the teacher view 130 may further be configured to display a pane in which a desktop of one or more student computing devices are mirrored. For example, by displaying a desktop of a specific student, the teacher can check in on the progress of the student in making an annotation, completing a poll, or completing another task. By displaying the desktops of a group of students, the teacher may gauge the progress of the class as a whole, and appropriately modify the tempo or content of the lesson.

Figure 3:
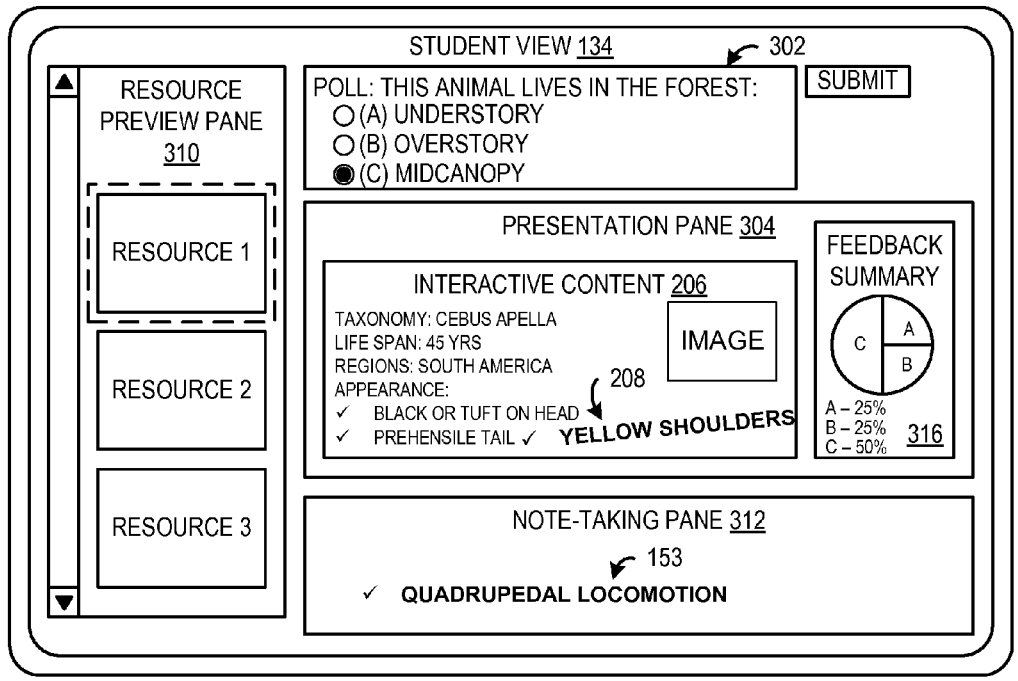
FIG. 3 is a schematic view of an embodiment of a graphical user interface presenting a student view of an educational presentation of the system of FIG. 1.

FIG. 3 is a schematic view of an embodiment of a GUI presenting a student view 134 displayed on a student computing device during presentation of an educational presentation. Student view 134 may include a presentation pane 304 which may display interactive content 206 of an educational presentation. In the illustrated embodiment, interactive content 206 includes the currently displayed educational resource of the educational presentation. The educational resource is supplemented with teacher annotation 208. Presentation pane 304 also may present a summary 316 of feedback which may be presented in response to students providing feedback to a poll question. Summary 316 of feedback may include a graphical representation to visually convey the information of the summary.

Student view 134 may include an educational resource preview pane 310 which may display a miniaturized list of educational resources in the educational presentation for reference by a student during presentation of the educational presentation.

Student view 134 may include a note-taking pane 312 in which a student may input notes and/or annotations. In the illustrated embodiment, the note-taking pane 312 includes a student annotation 153 supplementing the interactive content of the educational presentation in the student view, the student annotation being generated from input at the student computing device. The student annotations 153 entered in note-taking pane 312 may be integrated into a version of the educational presentation which may be stored in a storage device accessible by the student computing device for later use by the student. In some embodiments, the student annotations may be transmitted to the teacher computing device for evaluation and/or incorporation into a class view, for example, according to teacher-specified settings, if so desired.

Student view 134 may include a student feedback field 302 in which a student may enter feedback 152 to be sent to the teacher computing device. Feedback field 302 may be used by a student to answer a poll question, submit a collaborative annotation to a collaboration page, and/or submit a question or comment to the teacher, for example. The depicted feedback field 302 presents a poll to the user.

Alternatively, the feedback field 302 may be a text input box, for example, that is provided for submitting questions or comments, or annotations in response to a request for feedback from the teacher.

Figure 4:
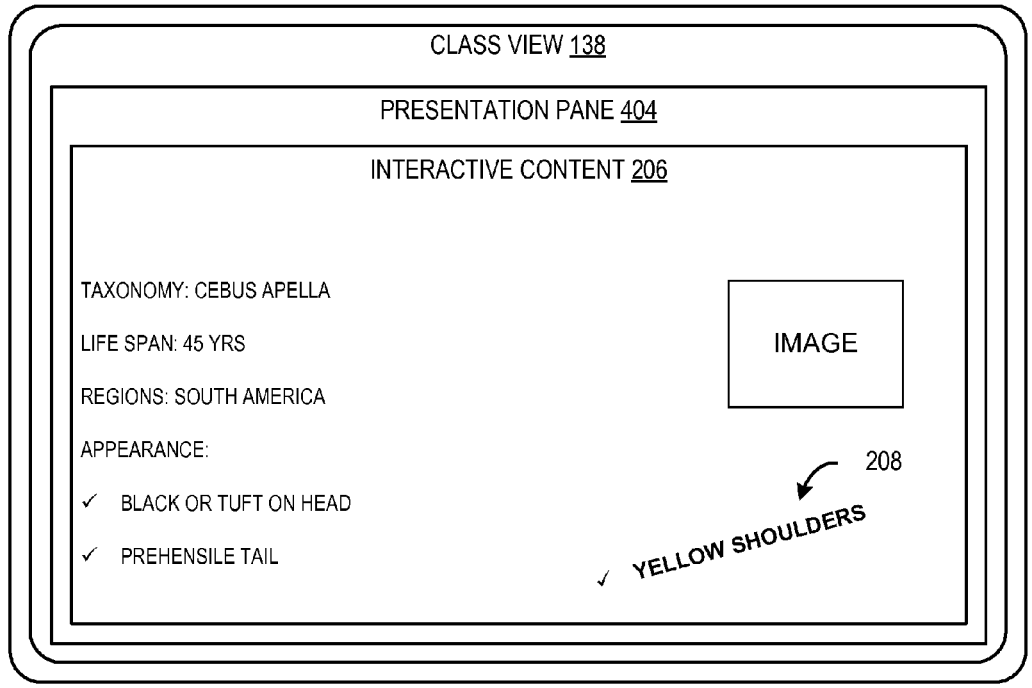
FIG. 4 is a schematic view of an embodiment of a graphical user interface presenting a class view of an educational presentation of the system of FIG. 1.

FIG. 4 is a schematic view of an embodiment of a GUI presenting a class view 138 displayed on a class display device in communication with a teacher computing device during presentation of an educational presentation. Class view 138 may include a presentation pane 404 which may display interactive content 206 of an educational presentation. In the illustrated embodiment, interactive content 206 includes the currently displayed educational resource of the educational presentation. The educational resource is supplemented with teacher annotation 208. Class view 138 may be simplified or generic relative to other independent views, as the class view is presented to a plurality of students and thus typically includes content that is suitable for presentation to the entire class.

Figure 5:
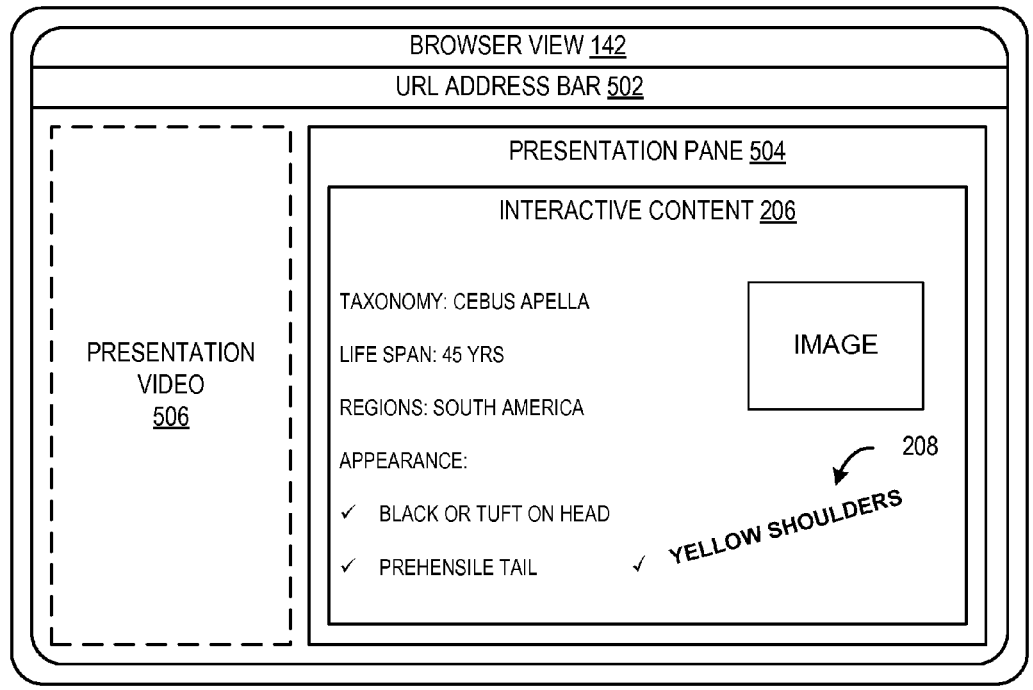
FIG. 5 is a schematic view of an embodiment of a graphical user interface presenting a browser view of an educational presentation of the system of FIG. 1.

FIG. 5 is a schematic view of an embodiment of a GUI presenting a browser view 142 displayed in a browser web application accessible remotely from a server computing device over a computer network by a remote computing device. Browser view 142 may include a uniform resource locator (URL) bar 502 in which a URL to access an educational presentation may be entered. Browser view 142 may include a presentation pane 504 which may display interactive content 206 of an educational presentation. In the illustrated embodiment, interactive content 206 includes the currently displayed educational resource of the educational presentation. The educational resource is supplemented with teacher annotation 208.

In some embodiments, browser view 142 may include a presentation video 506 which may display video imagery of the teacher presenting the educational presentation. In the case that the browser view is accessed during the presentation, the video may be streamed to the remote computing device in real-time. Alternatively, the video may be prerecorded and may be downloaded or streamed to the remote computing device. In some embodiments, the browser view may provide a subset of the functionality provided in the student view. For example, the browser view may be configured to view content distributed by the teacher, and to respond to polls, but may not be configured to enable users to make annotations.

Figure 6:
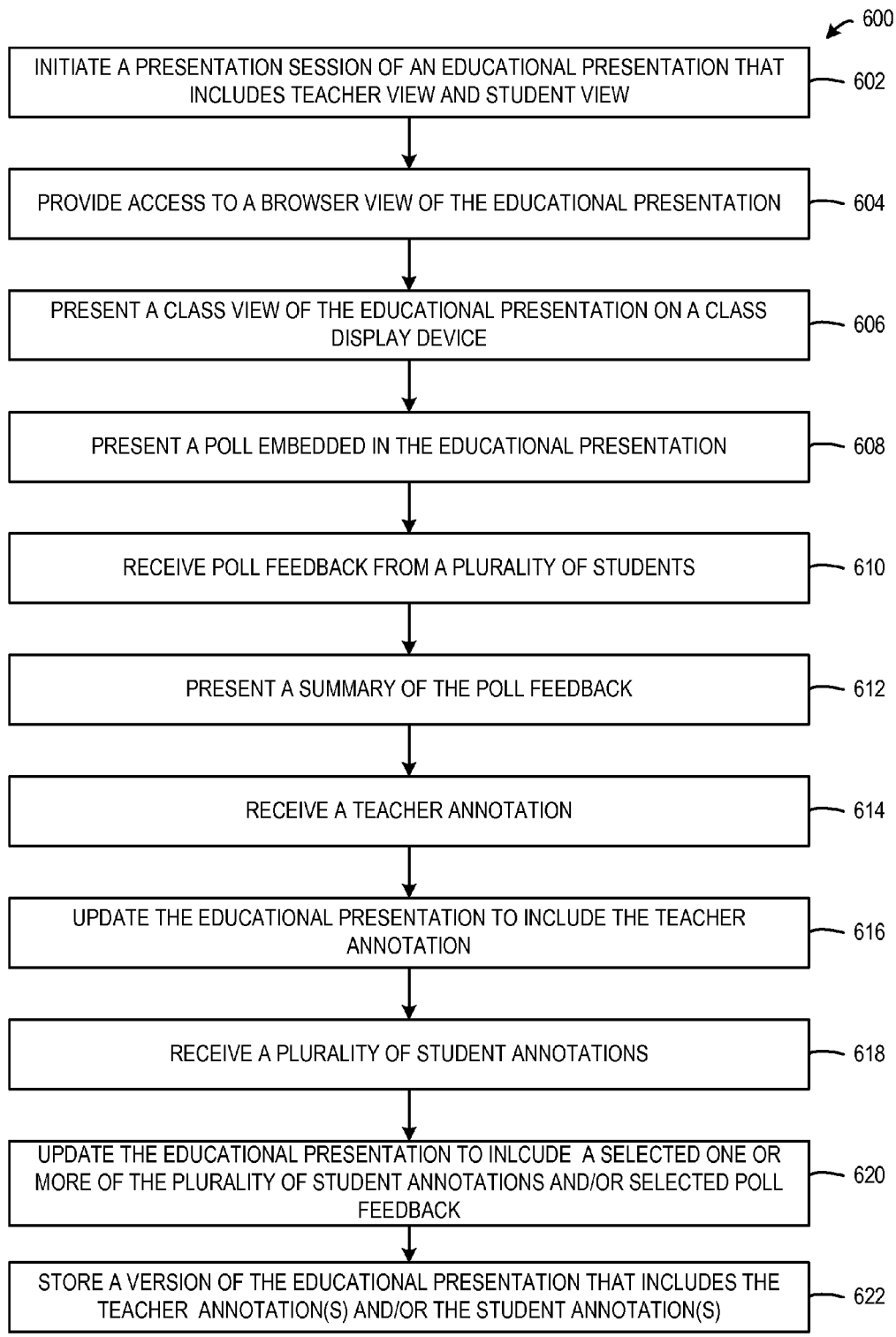
FIG. 6 is a flowchart of an embodiment of a method of presenting an educational presentation at a teacher computing device which promotes real-time student-teacher interaction and collaboration.

FIG. 6 shows a flowchart of an example method 600 of presenting an educational presentation at a teacher computing device which promotes real-time student-teacher interaction and collaboration. Method 600 may include, at 602, initiating a presentation session that displays a student view of an educational presentation at a student computing device of each of a plurality of students and displays a teacher view of the educational presentation that is independent of the student view at the teacher computing device. As described above, although the teacher view and student views are independently configurable, shared content may exist between the views.

At 604, the method may include during the presentation session, providing access to a browser view of the educational presentation accessible remotely from a server computing device over a computer network, the browser view being independent of the student view and the teacher view. As described above, although the browser view may be independently configurable relative to the teacher view and student view, it will be appreciated that shared content may exist between the views. Thus for example, the browser view may be an instance of the student view, which is viewable remotely via a web browser operated on a wide variety of devices, and which provides a subset of the functionality available in the student view.

At 606, the method may include during the presentation session, displaying a class view of the educational presentation at a class display device in communication with the teacher computing device, the class view being independent of the student view and the teacher view.

At 608, the method may include presenting a poll embedded in the educational presentation, a view of the poll being viewable in each of the student view and the teacher view. A view of the poll also may be viewable in the class view and the browser view.

At 610, the method may include receiving poll feedback from the student computing device of each of the plurality of students, the poll feedback being viewable in the teacher view. The method may thus further include displaying the poll feedback from each of the plurality of students in the teacher view. In some configurations, the poll feedback is viewable from the plurality of students is viewable in the teacher view alone. As discussed below, the student computing devices may be virtually any suitable computing device, such as a personal computing device, portable laptop computing device, a personal digital assistant, and a browser-enabled mobile communication device. Various user input devices may be used to submit poll feedback through these student computing devices, including a keyboard, mouse, trackpad, and/or remote control. The remote control may, for example, be an infrared wireless remote control configured with one or more buttons, such as a clicker device. The mouse, for example, may be a wireless presentation mouse enabled for Bluetooth® communication with the computing device, and configured with presentation controls by which poll feedback may be input. Of course, various other suitable user input devices may also be utilized with the student computing devices for the purpose of sending poll feedback, annotations, and other input.

At 612, the method may include presenting a summary of the poll feedback in the teacher view and the student view. The summary of the poll feedback also may be presented in the class view and the browser view.

At 614, the method may include receiving a teacher annotation. A teacher annotation may be generated from input at the teacher computing device in the manner described above, for example.

At 616, the method may include updating the educational presentation to include the teacher annotation that is viewable in the teacher view and the student view. The teacher annotation also may be viewable in the class view and the browser view.

At 618, the method may include receiving a plurality of student annotations that are viewable in the teacher view. The method may further include displaying the plurality of student annotations in the teacher view. In some configurations, the annotations from the plurality of students are viewable in the teacher view alone.

At 620, the method may include updating the educational presentation to include a selected one or more of the plurality of student annotations in the student view and/or selected poll feedback received from the plurality of students. The selection may be made based on input received from a teacher at the teacher computing device, for example.

At 622, the method may include storing a version of the educational presentation that includes the teacher annotations and the selected one of the student annotations in storage accessible by the teacher computing device and the student computing device of each of the plurality of students. For example, the version of the educational presentation may be stored in a storage device of the teacher computing device which may be accessible by the student computing device via the network. As another example, the version of the educational presentation may be stored in a storage device remote from the teacher computing device and the student computing devices, such as in a storage device of a server computing device. The version of the educational presentation may be accessible by teacher computing device and/or the student computing devices by communicating with the server computing device over the network.

It will be appreciated that initiating the presentation, creating the independent views, presenting interactive content (e.g., poll and feedback), and updating the educational presentation with annotations may be accomplished by a presentation module of the presentation application program, as described above. Further, receiving interactive content such as poll feedback and student annotations may be accomplished by an interaction module of the presentation application program, as described above.

The above systems and methods may promote effective student-teacher interaction and collaboration during presentation of an educational presentation. By presenting polls and other assessment mechanisms embedded in the educational presentation and receiving immediate real-time feedback from students, a teacher can adjust lesson presentation content or pacing as needed to meet lesson plan goals. Moreover, the feedback information may be available for in-class review or grading. In this way, real-time classroom experiences may be enriched.

Furthermore, by dynamically updating the educational presentation with teacher annotations and/or selected student annotations, the educational presentation may be enhanced with relevant content which may be available for future use or review. Further, student participation may be increased for large class sizes or in situations with limited discussion time, and also participation from students who may be intimidated from speaking out in class may be increased. In this way, teacher presentation and student note taking and feedback experience may be enhanced.

Further, via the browser view, authorized third parties, such as students and parents of students, may view lessons from home, including the interactive content such as student annotations and feedback that has been made available to the browser view by the teacher. In this manner, students may review portions the classroom experience from home, for example, and parents may share the educational experience with their children.

It will be appreciated that the embodiments described herein may be implemented, for example, via computer-executable instructions or code, such as programs, stored on computer-readable storage media and executed by a computing device, such as a processor of server computing subsystem, for example. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including, but not limited to, personal computers, servers, laptop computers, hand-held devices, microprocessor-based programmable consumer electronics and/or appliances, etc.

It will be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computerized presentation system comprising:
   a first computing device having a processor and non-transitory computer a storage device, the non-transitory computer storage device storing a presentation application program executable by the processor of the first computing device, the presentation application program including:
      a presentation module configured to be operable in an author mode to create a presentation file for a presentation having a plurality of resources, the presentation file being stored on a selected storage device selected from the group consisting of the non-transitory computer storage device of the first computing device and a non-transitory computer storage device of a networked computing device, and the presentation module configured to be operable in a presentation mode to make the presentation accessible for viewing at respective display devices of a plurality of second computing devices in communication with the first computing device via a computer network, to provide access to a browser view of the presentation accessible remotely from a server computing device over the computer network by a remote computing device, the server computing device reading the presentation file from the selected storage device, and the browser view being independent of a first view and a second view, and to present one or more of the plurality of resources via one or more display devices of one or more of the first computing device, the plurality of second computing devices, and the remote computing device, a view of one or more of the plurality of resources being viewable in each of the first view, the browser view, and the second view; and
      an interaction module configured to, during the author mode, receive user edits via user selection at the first computing device of a function on an author tool of the interaction module, and update content of one or more resources of the presentation based on the user edits by reading the presentation file from the selected storage device, updating the presentation file to include the one or more resources that are updated, and storing the presentation file, as updated, on the selected storage device, and during the presentation mode, receive second feedback at the first computing device in response to presentation of the one or more resources at the respective display devices of the plurality of second computing devices, the second feedback for a single second computing device being viewable at a display device of that second computing device, and the second feedback from all second computing devices being viewable in the first view;
      wherein the plurality of resources further includes a collaboration page and the interaction module is further configured to, during the author mode, edit the presentation file, as stored at the selected storage device, in response to receiving user edits via the author tool and during the presentation mode, update the presentation with first annotations and selected second annotations via presentation logic of the interaction module in response to presentation of the collaboration page at the respective display devices of the plurality of second computing devices, the selected second annotations being selected from a plurality of second annotations received at the first computing device based on user input at the first computing device and wherein the presentation module is further configured to, during the presentation mode, generate and present a summary of the second feedback on at least a display device of the first computing device, the summary of the second feedback being viewable in the first view, the second view, and a third view.

2. The system of claim 1, wherein the summary of the second feedback includes a graphical representation of the second feedback.

3. The system of claim 1, wherein the presentation application program is further configured to be at least partially executable on the plurality of second computing devices and includes a note taking module configured to receive second annotations to be added to a version of the presentation that is local to that second computing device.

4. The system of claim 3, wherein the presentation application program is further configured to store the version that is local in storage accessible by that second computing device.

5. The system of claim 1, wherein each of the plurality of resources is selected from the group consisting of image files, video files, slide deck files, audio files, executable files, and document files.

6. The system of claim 1, wherein the presentation module is further configured to, during the author mode, present one of a plurality of presentations for editing based on receiving a presentation selection at the first computing device, the plurality of presentations being stored in a storage device accessible by the first computing device.

7. The system of claim 6, wherein the second computing device is selected from the group consisting of a personal computing device, a portable laptop computing device, a personal digital assistant, and a mobile communication device.

8. The system of claim 1, wherein the computer network includes wireless communication capabilities and the remote computing device is configured to wirelessly connect to the computer network.

9. The system of claim 1, wherein the presentation application program is further configured to present a graphical user interface that includes the author tool having function selectors configured to perform an operation selected from the group consisting of distributing the presentation, creating a poll, creating a poll feedback summary, creating the resource, annotating the resource, and creating a collaboration page.

10. On a processor of a first computing device, a method of presenting a presentation stored on a non-transitory computer storage device of the first computing device as a presentation file, the method comprising:
   initiating a presentation session that reads the presentation file from the non-transitory computer storage device and displays a second view of the presentation at a display device of a second computing device of each of a plurality of users and displays a first view of the presentation that is independent of the second view at a display device of the first computing device;

receiving a user edit via an author tool of an interaction module;
editing the presentation file to correspond with the user edit and storing the presentation file, as edited, on the non-transitory computer storage device;
receiving, from the first computing device or the second computing device of one of the plurality of users, a first annotation;
updating the presentation file to include the first annotation that is viewable in the first view and the second view;
receiving, from the first computing device or the second computing device of one of the plurality of users, a plurality of second annotations that are viewable in the first view; and
updating, via presentation logic of the interaction module, the presentation file to include a selected one of the plurality of second annotations in the second view; and
during the presentation session, displaying a third view of the presentation at a third display device in communication with the first computing device, the third view being independent of the second view and the first view.

11. The method of claim 10, further comprising:
presenting a poll embedded in the presentation, a view of the poll being viewable in each of the second view and the first view;
receiving poll feedback from the second computing device of each of the plurality of users, the poll feedback being viewable in the first view; and
presenting a summary of the poll feedback in the first view and the second view.

12. The method of claim 10, further comprising:
storing a version of the presentation that includes the first annotations and the selected one of the second annotations in storage accessible by the first computing device and the second computing device of each of the plurality of users.

13. The method of claim 10, further comprising:
during the presentation session, providing access to a browser view of the presentation accessible remotely from a server computing device over a computer network, the browser view being independent of the second view and the first view.

14. A computerized presentation system, comprising:
a first computing device having:
 a processor;
 a network interface coupling the first computing device to at least a second computing device via a network;
 a display device; and
 a non-transitory computer storage device having instructions stored thereon, which when executed by the processor provide a presentation application program, the presentation application program including:
  a presentation module configured to be operable in an author mode to create a presentation file storing, on a selected storage device selected from the group consisting of the non-transitory computer storage device of the first computing device and non-transitory computer a storage device of a networked computing device, a presentation having a plurality of resources including a collaboration page, the presentation module displaying the presentation only at the display device of the first computing device without being accessible for viewing at other computing devices during the author mode, and configured to be operable in a presentation mode to make the presentation accessible for viewing at respective display devices of a plurality of second computing devices in communication with the first computing device via the network, the presentation being accessible for viewing at the plurality of second computing devices responsive to initiating the presentation mode, present a third view of the presentation on a third display device in communication with the first computing device, the third view being independent of a first view and a second view, present a poll embedded in the presentation, a view of the poll being viewable at one or more display devices of one or more of the first computing device, the plurality of second computing devices, and the third display device, a view of one or more of the plurality of resources being viewable in each of the first view, the second view, and the third view, and present a summary of poll feedback at one or more display devices of one or more of the first computing device, the plurality of second computing devices, and the third display device, the summary of poll feedback being viewable in the first view, the second view, and the third view; and
 an interaction module configured to, during the author mode, receive user edits via an author tool of the interaction module and update one or more resources of the presentation and edit the presentation based on the user edits by reading the presentation file from the selected storage device, updating the presentation file to include the one or more resources that are updated, and storing the presentation file, as updated and edited, on the selected storage device, and during the presentation mode, update the presentation with first annotations and/or selected second annotations in response to presentation of the collaboration page at the respective display devices of the plurality of second computing devices, the selected second annotations being selected from a plurality of second annotations received at the first computing device based on user input at the first computing device, and receive poll feedback from the second computing device of each of the plurality of users, the poll feedback for a single second computing device being viewable at a display device of that second computing device, and the poll feedback from all second computing devices being viewable in the first view.

15. The system of claim 14, wherein the third display device includes a network-connected projection device.

16. The system of claim 1, wherein the presentation module is further configured to display the presentation only at the first computing device on which the presentation is being created or edited without being accessible for viewing at other computing devices during the author mode, while making the presentation accessible for viewing at one or more other computing devices different from the first computing device during the presentation mode.

17. The system of claim 1, wherein the plurality of resources includes at least a poll, the poll being embedded in the presentation and a view of the poll being viewable in each of the first view, the second view, and the browser view.

* * * * *